United States Patent [19]

Dyrud et al.

[11] Patent Number: 4,807,619

[45] Date of Patent: Feb. 28, 1989

[54] RESILIENT SHAPE-RETAINING FIBROUS FILTRATION FACE MASK

[75] Inventors: James F. Dyrud, New Richmond, Wis.; Harvey J. Berg, St. Paul; Alice C. Murray, Maplewood, both of Minn.

[73] Assignee: Minnesota Mining and Manufacturing Company, St. Paul, Minn.

[21] Appl. No.: 848,757

[22] Filed: Apr. 7, 1986

[51] Int. Cl.$^4$ ............................................. A62B 7/10
[52] U.S. Cl. ........................... 128/206.16; 128/206.19
[58] Field of Search ...................... 128/205.27–205.29, 128/206.11–206.19, 206.24; 2/9, 206; 162/157.1–157.3; 428/224, 284, 286.7

[56] References Cited

U.S. PATENT DOCUMENTS

| Re. 31,285 | 6/1983 | van Turnhout et al. | 55/155 |
|---|---|---|---|
| 3,316,904 | 5/1967 | Wall et al. | 128/206.12 |
| 3,595,731 | 7/1971 | Davies et al. | 161/150 |
| 3,603,315 | 9/1971 | Becker | 128/206.19 |
| 3,613,678 | 10/1971 | Mayhew | 128/206.19 |
| 3,620,214 | 11/1971 | Thackston | 128/206.19 |
| 3,688,768 | 9/1972 | Reimschussel et al. | 128/206.12 |
| 4,118,531 | 10/1978 | Hauser | 428/224 |
| 4,215,682 | 8/1980 | Kubik et al. | 128/205.29 |
| 4,300,549 | 11/1981 | Parker | 128/206.19 |
| 4,323,063 | 4/1982 | Fisichella | 128/206.12 X |
| 4,536,440 | 8/1985 | Berg | 428/284 |
| 4,547,420 | 10/1985 | Krueger et al. | 428/229 |
| 4,551,378 | 11/1985 | Carey, Jr. | 428/198 |
| 4,628,927 | 12/1986 | Ward | 128/206.17 |

FOREIGN PATENT DOCUMENTS

| 0121299 | 1/1984 | European Pat. Off. | |
| 2024651 | 1/1980 | United Kingdom | 128/206.19 |
| 2059782 | 4/1981 | United Kingdom | 128/206.12 |
| 2077112B | 3/1985 | United Kingdom | |
| WO81/0109 | 4/1981 | World Int. Prop. O. | 128/206.12 |
| WO81/03266 | 11/1981 | World Int. Prop. O. | 128/206.13 |

*Primary Examiner*—Kyle L. Howell
*Assistant Examiner*—Angela D. Sykes
*Attorney, Agent, or Firm*—Donald M. Sell; Roger R. Tamte

[57] ABSTRACT

New molded fibrous filtration face masks that are highly resilient and shape-retaining are provided using one or more molded fibrous shaping layers, with a fibrous filtration layer disposed on one side of or between the molded fibrous shaping layers; the molded fibrous shaping layers having a total basis weight of at least 150 g/m2, and at least one of the fibrous shaping layers having an average density over the central area of the face mask of no greater than about 0.2 g/cc, such that at bends of the layer during deformation of the face mask the layer elastically deforms and tends to return to its original thickness and shape when the deforming pressure is removed.

57 Claims, 1 Drawing Sheet

U.S. Patent     Feb. 28, 1989     4,807,619
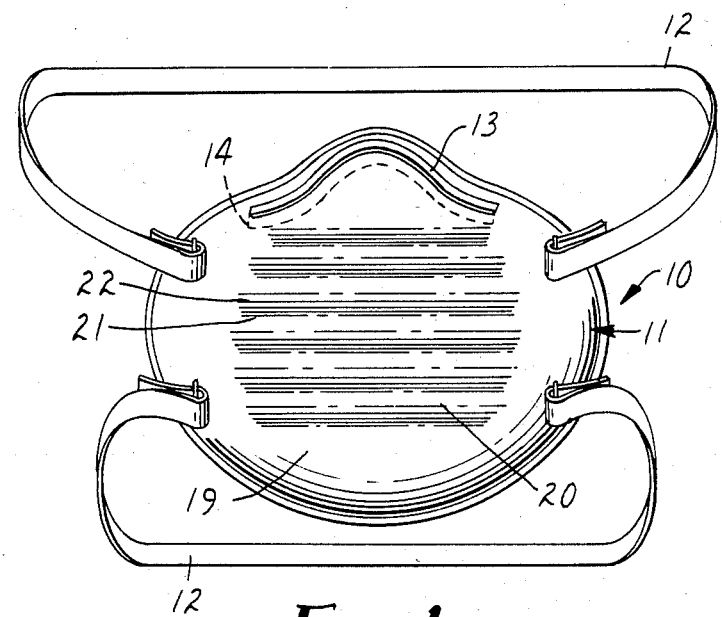
Fig. 1
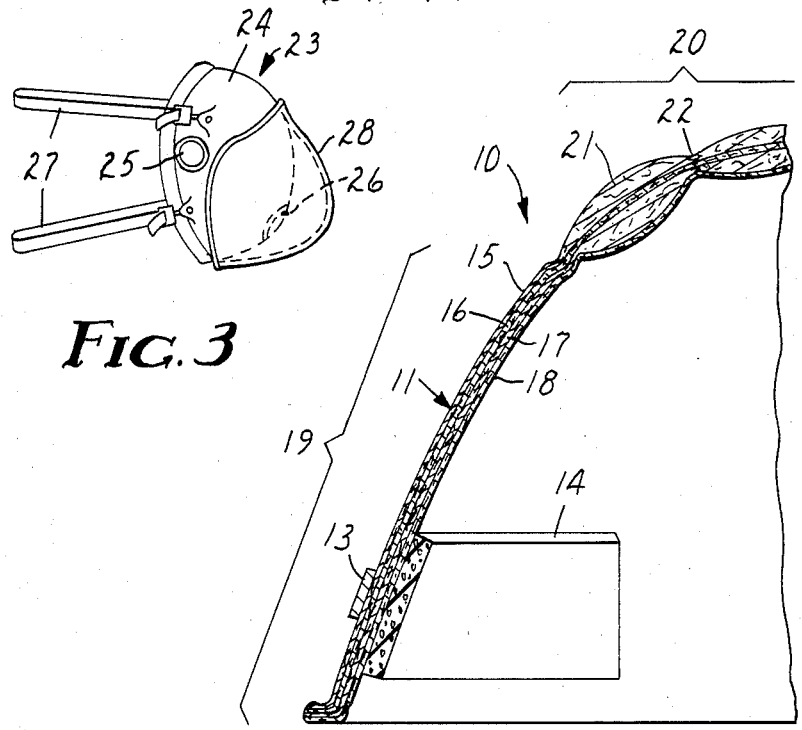
Fig. 3
Fig. 2

RESILIENT SHAPE-RETAINING FIBROUS FILTRATION FACE MASK

FIELD OF THE INVENTION

The present invention relates to fibrous filtration face masks or respirators worn to protect against certain air pollutants, and to processes for producing such masks.

DESCRIPTION OF THE PRIOR ART

British Pat. No. GB 2,077,112B teaches a molded filtration face mask in which a flexible, moderately stiff plastic net material is laminated to a conventional fibrous filtration layer to help the mask resist distortion from its original shape. While such shape-retention can be advantageous, the addition of the flexible net sacrifices other desirable attributes of a molded fibrous filtration mask: the mask is heavier, stiffer and more costly to make than prior art molded fibrous filtration masks. Additionally, when a single, outer plastic net is utilized, high moisture and particulate loading conditions can cause the filtration layer to separate from the net, thereby allowing the filtration layer to collapse and concurrently destroy the functionality of the mask.

SUMMARY OF THE INVENTION

The present invention provides new molded fibrous filtration face masks or respirators, which are highly resilient and shape-retaining, and in which such resilience and shape-retention are achieved in a lightweight simplified structure of low manufacturing cost and high filtration efficiency. This new resilient molded fibrous filtration product can be briefly summarized as comprising (a) one or more molded fibrous shaping layers that comprise fibers bonded to one another and to other included fibers at intersection points throughout the layer; and (b) a fibrous filtration layer disposed on one side of or between said molded fibrous shaping layers, the filtration layer removing a higher percentage of particles from a gaseous stream than the shaping layers remove, with the molded fibrous shaping layers having a total basis weight (the "finished" basis weight referred to later herein) of at least about 150 grams per square meter, and with at least one fibrous shaping layer having an average density over the central areas of the face mask of no greater than about 0.2 gram per cubic centimeter, such that at bends of the layer during deformation of the respirator the layer elastically deforms and tends to return to its original thickness and shape when the deforming pressure is removed.

As an indication of their resiliency, when the central or nose portion of masks of the invention is pressed or deformed (even through a distance of 5 centimeters in preferred masks; see a test described later herein), the masks can quickly recover their original shape upon removal of the deforming force. Masks of the invention also have a high resistance to deformation. Preferably, a face mask of the invention resists deformation in the deformation test described later herein with a force of at least about 5 Newtons (somewhat more than 1 pound) and more preferably with a force of at least about 7.5 Newtons.

To achieve the best results, a molded fibrous shaping layer in a face mask of the invention includes rather coarse or large fibers, i.e., 10 denier or larger. Also, the fibers in the shaping layer preferably comprise thermally bondable bicomponent fibers having at least first and second components extending over the length of the fibers, with the first component melting at a temperature lower than the second component. The bicomponent fibers offer several advantages, including uniformity and thoroughness of bonding throughout the shaping layer as well as a tendency to crimp during processing, e.g., in a prebonding operation noted below or in the molding operation; the crimping is believed to improve resiliency of the shaping layer. Other fibers can be included with bicomponent fibers. For example, crimped staple fibers appear to provide greater resilience and are desirably included in some products of the invention.

A preferred process for preparing face masks of the invention includes the step of subjecting the shaping layer to heat before the step of molding the mask. During this preliminary step, the web rests on a support surface but is generally unrestrained and the fibers in the layer crimp and become bonded at least partially to one another. The heat exists generally uniformly throughout the web, so bonding is generally uniform throughout the web, providing good mechanical strength and integrity and uniformity of properties. Also, the crimping of the fibers causes a greater bulkiness of the web and creates additional convolutions of the interstices through the web. When the shaping layer is later molded into a face mask shape, the face mask has better resiliency and greater loftiness than when it is not prebonded.

Other aspects of the process include maintaining a sufficient gap in the mold to obtain the noted lower-than-maximum density in the shaping layer. Greater loft may be obtained in portions of the shaping layer, e.g., in bands extending across at least a portion of the central area of the face mask, by using a correspondingly shaped or slotted mold, and use of such loftier bands, which alternate with bands of lesser thickness in a generally parallel pattern, further improves resiliency. Also, the side portions of the web typically become more compacted than the central portions of the mask, such that the ratio of the density of the side portions of the mask body to the density of the central portion of the mask body is preferably at least 1, and more preferably at least 1.5.

In a preferred process for molding a face mask of the invention, the several recited layers are subjected to the molding operation while assembled in face-to-face contact (in a manner described in U.S. Pat. No. 4,536,440, which is incorporated herein by reference). Preferably the shaping layers are in a lofty (and as noted above, preferably at least partially prebonded) form at the start of the molding operation, and thus cushion and insulate the filtration layer during the molding operation. Although the filtration layer would tend to be stretched or torn if subjected to the molding operation without the support of the shaping layer, the filtration layer is maintained intact during the layer-to-layer molding operation, and there is minimal folding over of the layer. No significant reduction of the filtration properties occurs during the molding operation, and the finished product exhibits uniform filtration properties over the full filtration area of the product. Not only are good properties obtained, but the operation is direct and simple, with a finished product being obtained directly from the basic fibrous layers in one step.

DESCRIPTION OF DRAWINGS

FIG. 1 is a front view of an illustrative finished face mask or respirator of the invention.

FIG. 2 is a sectional view through a portion of the face mask shown in FIG. 1, and FIG. 3 is a perspective view of a different illustrative face mask of the invention.

DETAILED DESCRIPTION

An illustrative face mask or respirator of the invention 10 is shown in FIGS. 1 and 2 and comprises a mask body 11, elastic head bands 12 which are stapled or otherwise attached to the mask body for holding the mask over a human face, a pliable dead-soft band 13 of a metal such as aluminum by which the nose portion of the mask can be shaped and held in a desired fitting relationship with the nose of the wearer, and a strip 14 of soft conformable material such as foam rubber to improve the seal between the mask and the face and to make the mask more comfortable to wear. The mask body 11 has a cup or generally hemispherical shape so that it stands out in a spaced relationship from normal human faces and makes a snug low-pressure contact over the bridge of the nose, across the cheeks, and under the chin. Face masks of the invention appear to offer improved fit to a face, e.g., because of better resilience.

As shown in FIG. 2, the mask body 11 preferably comprises four layers, a first (furthest upstream in a gaseous stream flowing through the mask) resilient shaping layer 15, a filtration layer 16, a second resilient shaping layer 17, and a soft inner liner 18 (e.g., made from finer-denier fibers) which provides a smooth surface for contact with the skin and which may also contribute to the resilience of the mask.

FIG. 2 also illustrates the preferred loft profile of a filtration mask of the invention. The lower, generally cylindrically shaped side portion of the filtration masks of this invention identified as the general area 19, is, as noted above, generally a denser, comparatively rigid member while the upper, generally hemispherically shaped filtration element identified as the general area 20, is a loftier, more resilient member. The term "central area" of a mask of the invention occasionally used herein refers generally to the area 20.

As discussed above, variations in mold design can be used to introduce additional structural elements, such as corrugated patterns or beam structures into the shaping layer to further improve its resilience and/or shape retention properties. A slotted mold will provide the structure shown in FIG. 2 in which bands 21 of greater thickness and loft alternate with bands 22 of lesser thickness in a generally parallel pattern.

As stated above, this central area generally has a density of no more than 0.2 gram per cubic centimeter. The density referred to herein means the average density over the whole central area 20. With such loft or reduced density, the layer can elastically narrow or become thinner during deformation of the mask, and the bonded nature of the fibers in the layer cause the deformed fibers to return generally to their original shape when the deforming force is withdrawn.

Although the term "resilient shaping layer" is used in this description, the resilient shaping layer may also have other functions, which in the case of the outermost layer may even be a primary function, such as protection of the filtration layer and prefiltration of a gaseous stream. Also, although the term "layer" is used in this description, one layer may in fact comprise several sublayers, assembled to obtain the desired thickness or weight. In some embodiments only one, generally inner, resilient shaping layer (but which may comprise two or more sublayers) is included in a mask of the invention, but shaping is accomplished more durably and conveniently when two resilient shaping layers are used, one on either side of the filtration layer. Alternatively, the outer shaping layer and filtration layer may be omitted from the molding operation and replaced with a preformed outer shell (which may or may not have bonding between fibers) and a preformed filtration layer, and the latter layers heat-welded to the inner shaping layer to produce a face mask of the invention.

The fibers in the resilient shaping layer are usually between 1 and 200 denier and preferably, except for the inner layer, average greater than 10 denier but less than 100 denier (e.g., smaller fibers provide more fiber intersection points per unit of basis weight). In preferred embodiments, the resilient shaping layer comprises a mixture of synthetic staple fiber, preferably crimped, and bicomponent staple fiber. The latter carries a binder material component by which the resilient shaping layer can be bonded together at fiber intersection points, e.g., by heating the layer so that the binder material on the bicomponent fibers flows into contact with adjacent fibers that are either bicomponent or other staple fibers. Shaping layers in face masks of this invention can be prepared from fiber mixtures including staple fiber and bicomponent fiber in a weight-percent ratio ranging from 0/100 to 75/25. Preferably, the shaping layers include at least 50 weight-percent bicomponent fiber, and more preferably at least 75 weight-percent bicomponent fiber, since the resulting greater number of intersection bonding points increase resilience and shape-retention.

Face masks of the invention can also be prepared without bicomponent fiber. For example, binder fibers of a heat-flowable polyester can be included together with staple, preferably crimped, fibers in a shaping layer, and upon heating of the shaping layer the binder fibers melt and flow to a fiber intersection point where they surround the fiber intersection point. Upon cooling of the layer, bonds develop at the intersection points. Also, binder materials such as acrylic latex can be applied to a web of fibers being used as a shaping layer, e.g., as a supplement to binder or bicomponent fibers. Also, binder materials in the form of powdered heat-activatable adhesive resins may be cascaded onto a web of fibers, whereupon when the web is heated the fibers in the web become bonded together at intersection points by the added resin. But shaping layers of the invention are preferably free from such added binder material since they increase material and processing costs and contribute to increased flammability of the finished face masks. The present invention represents significant cost savings potential through the elimination of raw materials (e.g., the post-molding consolidation resin) or other components and the reduction of material handling steps.

Suitable bicomponent fibers for shaping layers of the invention include, for example, side-by-side configurations, concentric sheath-core configurations and elliptical sheath-core configurations. One particularly useful bicomponent fiber for producing the shaping layers of this invention comprises a generally concentric sheath-core configuration having a core of crystalline polyethylene terephthalate (PET) surrounded by a sheath of a polymer formed from isophthalate and terephthalate ester monomers. The latter polymer is heat softenable at a temperature lower than the core material. Polyester has the advantages that it contributes to resiliency and has less moisture uptake than other fibers.

Crimped synthetic staple fibers, usually single-component in nature, suitable for webs of the invention include, but are not limited to polyethylene terephthalate (PET), the preferred material, nylon and polypropylene. Regularly crimped fibers, such as those prepared by gear crimping processes, irregularly crimped fibers such as those obtained from stuffer box crimping, or helically crimped fibers such as those obtained from the so-called "Agilon" process can be utilized to prepare webs of the invention. The number of crimps per inch can vary widely, however, generally speaking, higher crimp frequencies produce loftier resilient shaping layers. Crimp frequencies in the range of 6 to 12 crimps per inch (2 to 5 crimps per centimeter) are preferred. Also, the percent crimp of the fibers, as measured for example, in column 6 of U.S. Pat. No. 4,118,531, is generally at least 15 percent for added crimped staple fibers. As noted above, the bicomponent fibers also can crimp during processing, which further contributes to resiliency.

A web of fibers to be used as a shaping layer can be conveniently prepared on a "Rando Webber" air-laying machine or a carding machine, and the bicomponent fibers and other fibers are typically used in conventional staple lengths suitable for such equipment.

The resiliency and shape-retention of a face mask of the invention are obtained with shaping layers that have a basis weight of at least 150 grams per square meter. Greater basis weight, e.g., 200 or 250 grams per square meter, provide greater resistance to deformation and greater resiliency. Together with these minimum basis weights, the shaping layers have a maximum density of 0.2 gram per square centimeter. During deformation, the shaping layer deforms in a way different, for example, from the way a dense paper-like sheet would deform. In a molded cup-shape, a dense paper-like sheet bends sharply and bows inwardly so that internal forces in the layer tend to hold the deformed cup in the inwardly bowed state. The density in a shaping layer of a mask of the invention is less than that in a typical paper-like sheet, with the result that the layer does not bend as sharply as paper and the fibers can elastically shift within the layer. Upon release of the force acting to deform the mask, the internal forces within the mask— e.g., the association through fiber bonding of the deformed fibers—tend to cause the shaping layer to return to its original shape.

In molding a shaping layer for use in a mask of the invention, a web of fibers can be placed between male and female mold parts which are gapped to allow greater loft generation in the central, generally hemispherically shaped filtration area 20 of the mask, and heating the layer. Use of high-basis-weight webs can automatically force the mold open even if it is set for a gap of zero spacing. Gapping is chosen so that the layers do not become too lofty, i.e., so lofty that the mask exhibits less than desired resistance to deformation. The web of fibers for the shaping layer is preferably a dry, fluffy, prebonded web, such as prepared in air-laying equipment and subsequently heated to lightly bond the web together, having a loft of at least 5 millimeters or more prior to the molding operation.

Prebonding of the resilient shaping layers is preferably effected by heating the unrestrained web of fibers in an oven e.g., at a temperature above the softening point of the lower-melting-point component of the bicomponent fiber, allowing the web to undergo controlled shrinkage in both the machine and cross-machine directions For example, prebonding of some preferred webs incorporating sheath/core bicomponent fibers above can be effected in a temperature range of 115° to 150° C., preferably in a stepped prebonding operation of heating the web at 115° C., cooling to ambient conditions and heating a second time at 150° C.

The shaping layer (or layers) included in a face mask of the invention can be molded by itself and then assembled with a filtration layer as known in the art. However, preferably a web (or webs) of fibers that is to serve as a shaping layer (or layers) is assembled together with a web (or webs) of fibers that is to serve as a filtration layer, and the whole assembly molded together to directly form a face mask (see U.S. Pat. No. 4,536,440). In the latter operation, the lofty web (or webs) that is to form the shaping layer (or layers) appears to provide cushioning for the filtration layer during the molding operation, tending to protect the filtration layer from rupture or folding. Also, the shaping layer may provide heat insulation for the filtration layer, which further maintains the desired fibrous structure of the filtration layer. The shaping layer is compacted during the molding operation, but maintains a porous fibrous and lower density structure, at least in the central area 20. The temperatures and pressures are selected to preserve the fibrous nature of the layers, e.g., by choosing temperatures above the softening point of the lower melting component of the bicomponent fiber in the shaping layer. The filtration layer becomes attached to the resilient shaping layer or layers, at least by entanglement of fibers at the interface between the layers, and usually also by some binding of fibers of the resilient shaping layer to the filtration layer.

The resilient shaping layer (or layers) in a face mask of the invention is typically not a primary filtering layer, though it may serve some prefiltering or coarse filtering action. It (or they) should be sufficiently porous so as to contribute only a minor portion of the pressure drop through the filtration product. The total shaping layers in a face mask, whether a single resilient shaping layer or a combination of outer and inner shaping layers, should contribute less than half and preferably no more than about 20 percent of the pressure drop through the face mask of the invention. Low pressure drop through the shaping layer can be achieved, even though the shaping layer has a high basis weight, by making the fibers in the layer at least mostly of a coarse nature, e.g., 10 or 20 denier or larger. Generally, face masks of the invention exhibit a pressure drop of no more than about 50 millimeters of water, preferably no more than about 30 millimeters of water, at a face velocity of 85 liters per minute. When inner and outer shaping layers are used, they may individually not have the stated basis weight of at least 150 grams per square meter, but in combination they will have such a basis weight.

Typically, the filtration layer comprises fibers that do not become bonded together during the molding operation. The filtration layer is chosen to achieve desired filtering and generally removes a higher percentage of particles from the kind of gaseous stream which the face mask is intended to protect against. The particular fibers of the filtration layer are selected depending upon the kind of particulate to be filtered. Webs of melt-blown fibers, such as taught in Wente, Van A., "Superfine Thermoplastic Fibers" in *Industrial Engineering Chemistry*, Vol. 48, 1342 et seq (1956), especially when in a persistent electrically charged form (see Kubik et al, U.S. Pat. No. 4,215,682), are especially useful. Preferably these melt-blown fibers are microfibers having an average diameter less than about 10 micrometers (herein referred to as BMF for "blown microfiber"). Electrically charged fibrillated-film fibers as taught in van Turnhout, U.S. Pat. No. Re. 31,285, are also especially useful. Rosin-wool fibrous webs and webs of glass fibers are also useful, as are solution-blown, or electrostatically sprayed fibers, especially in microfilm form. Surprisingly, it has been found that the important filtration parameters of the filtration layers, such as percent penetration of particulate matter and pressure drop are not greatly altered if the filtration layer and shaping layer are molded in assembled condition.

The soft interface or inner liner (e.g., the innermost shaping layer) of the masks of the present invention should comprise fine fibers, e.g., less than 10 denier, and preferably less than 5 denier. One useful layer comprises a non-woven web consisting of a mixture of fine-denier bicomponent staple and fine-denier, crimped synthetic staple. Compositionally, the fibers can be the same as used in the other shaping layers.

FIG. 3 shows another illustrative respirator or mask 23 of the invention. In this embodiment, the illustrated mask 23 comprises a molded face piece 24 which includes an exhalation valve 25 and inhalation valve 26 and headbands 27. A removable cup-shaped filter body 28, which comprises an assembly of at least one shaping layer and filtration layer as described above, is attached to the face piece.

Other face masks of the invention may take other shapes besides the shape illustrated in FIGS. 1–3. For example, a face mask of the invention may be molded without the corrugations or bands shown, and instead have a smooth surface.

The invention will be further illustrated by the following examples. Examples 1–21 show resilient shells that may be combined with filtration layers, or with filtration layers and an outer cover layer, to form a complete mask of the invention. Although a filtration layer was not molded into these resilient shells, the results achieved (e.g., as to force resisting deformation or recovery of original shape) are representative of those that would have been achieved if a typical filtration layer such as a thin melt-blown microfiber layer, had been included.

EXAMPLE 1

A dry, fluffy, coarse-denier fibrous web having a basis weight of about 200 g/m² was made on a "Rando Webber" air-laying machine from a mixture of 25 weight-percent crimped 50-denier polyethylene terephthalate (PET) fibers, 1½ inches (3.8 centimeter) in length, and 75 weight-percent 15-denier bicomponent staple fibers, 1½ inches (3.8 centimeter) in length. The bicomponent fibers (available as "Melty Fiber Type 4080" from Unitika Limited, Osaka, Japan) comprise a core of polyethylene terephthalate having a melting temperature of approximately 245° C., and a sheath comprising a copolymer of ethylene terephthalate and ethylene isophthalate. The web was "prebonded" by heating in a circulated air oven at 115° C. for 1 minute and then cooling to room temperature.

A second, dry, fluffy, fine-denier fibrous web, for use as an inner liner, having a basis weight of about 50 g/m², was made on a "Rando Webber" air-laying machine from a mixture of 25 weight-percent crimped 1.75-denier PET fibers, 1½ inches (3.8 centimeter) in length, and 75 weight-percent 4-denier bicomponent "Melty Fiber Type 4080" staple fibers, 1½ inches (3.8 centimeter) in length. This inner liner web was also "prebonded" by heating in a circulating air oven at 115° C. for 1 minute.

A resilient shaping layer or shell was then molded from the two webs by placing an approximately 10 inch×10 inch (25 cm by 25 cm) laminate assembly (one layer of each web) over a heated, "Teflon"-coated, aluminum, cup-shaped male mold, with the inner liner web placed next to the male mold. The mold was heated to a temperature of about 140° C., which is within the thermosoftening range of the polymeric sheath of the bicomponent fibers of both layers. The assembly was promptly subjected to uniform pressing with a "Teflon"-coated aluminum female mold having a contour complementary to the male mold and heated to the same temperature. No gapping shims were included, but the webs being molded held the mask-forming portions of the mold parts apart by approximately 0.050 inch during the molding operation. The projected area of the mold was about 35.75 square inches (230 square centimeters) and a pressure of 215 pounds (963.2 Newton) was applied for about 10 seconds. After immediate separation of the mold parts, a compacted and unified molded resilient shell was removed which precisely conformed to the mold shape and retained that shape.

Densities of the central side wall portions of the face mask were obtained from 2.54 cm diameter disks (5.07 cm² area) cut from the respective areas of the mask. Web thicknesses were measured by visually contacting caliper probes with the web surfaces without distorting or compressing the samples. In those samples where there was a visual variation in thickness over the area of the samples, the thicknesses of the various areas were averaged and the computed average used to calculate the density. In this test, the central portion had a density of 0.135 gram per cubic centimeter, and the ratio of the densities of the side and central areas was 2.8. Through the prebonding operations the basis weights of the webs were increased and the final resilient shell, i.e., molded fibrous shaping layers, had a basis weight of 325.6 grams per square meter.

The resilience of the molded shell was characterized by measuring the force required to collapse the shell a predetermined distance and then observing if the shell would recover its original shape after the test probe was removed. A "King Fabric Stiffness Tester" (Model number CFG-10AFST available from J. A. King and Company, Greensboro, N. C.) modified so that the probe could be stopped at predetermined depths or deflections of 0.75, 1.00, 1.25, 1.50, 1.75 and 2.00 inch (1.91, 2.54, 3.18, 3.81, 4.41 and 5.08 centimeter) was used to conduct these tests. The test procedure involved placing the shell in the test apparatus such that the test probe was directly above the apex (i.e., center) of the shell, impinging the probe on the shell to a predetermined depth and noting the resistance (i.e., force) to that deflection, and then withdrawing the probe and observing if the shell recovered its original shape after the probe was withdrawn.

A force of 3.31 pounds (14.83 Newtons) was required to collapse the shell to a two-inch, or 5-centimeter (i.e., full) deflection, and the shell immediately recovered its original shape as the test probe was withdrawn.

| EXAMPLE | PREBOND TEMP.(°C.) | RESISTANCE FORCE NEWTONS | DENSITY CENTRAL PORTION (g/cc) | SIDE-TO-CENTRAL DENSITY RATIO | FINISHED BASIS WEIGHT (g/m²) |
|---|---|---|---|---|---|
| 3 | 115 | 12.19 | 0.135 | 2.79 | 276 |
| 4 | 150 | 20.47 | 0.143 | 2.34 | 355 |
| 5 | 115/150 | 18.01 | 0.132 | 2.34 | 286 |

EXAMPLE 2

Example 1 was repeated except that a crimped 15-denier polypropylene fiber, 1½ inches (3.8 centimeter) in length, was substituted for the 50-denier PET fiber in the coarser-denier web and the basis weight of both the coarse-denier and fine-denier shaping layers was about 100 g/m². The basis weight of the finished shell was 177.6 grams per square meter (apparently there was variation in basis weight over the area of the mask such that the one-inch-diameter section measured to determine basis weight was lower than the average basis weight for the complete mask).

The density of the central portion of the mask was 0.083 and ratio of side to central area density was 3.84.

EXAMPLE 3-5

Example 1 was repeated except that the coarse-denier shaping layer and the fine-denier shaping layer each had a basis weight of 100 g/m², for a total input web basis weight of 200 gm/m², and the prebonding temperature for the input webs was varied. In all cases, the coarse- and fine-denier webs were prebonded under identical conditions (i.e., 1 minute at the indicated temperature). Prebonding in Example 5 was accomplished by first heating each web for 1 minute at 115° C., allowing them to cool to room temperature and heating them a second time at 150° C. for 1 minute. Each resulting mask could be deflected the full two inches (5 centimeter) with recovery.

EXAMPLES 6-10

Examples 6-10 demonstrate the impact of the basis weight of the input webs on the properties of the molded resilient shaping shells. They also demonstrate that the desired basis weight of the input webs can be achieved by laminating several lower basis weight webs together to achieve the desired target basis weight. These examples utilize a coarser-denier web feed stock identical to that described in Example 1 except that it had a basis weight of about 50 g/m². Similarly, the fine-denier web feed stock for these examples is identical to that described in Example 1 except that it had a basis weight of about 50 g/m². The laminate assembly used to form the resilient shell was prepared by laying multiple layers of the coarse-denier web over a single fine-denier web prior to the molding operation.

| EXAMPLE | COARSE-DENIER LAYERS | FINE-DENIER LAYERS | TOTAL INPUT BASIS WEIGHT (g/m²) | TOTAL FINISHED BASIS WEIGHT (g/m²) | RESISTANCE FORCE (NEWTONS) | DENSITY CENTRAL PORTION (g/cc) | SIDE-TO-CENTRAL DENSITY RATIO |
|---|---|---|---|---|---|---|---|
| 6 | 1 | 1 | 100 | 118.4 | 1.34 | 0.069 | 4.90 |
| 7 | 2 | 1 | 150 | 207.2 | 5.33 | 0.09 | 4.95 |
| 8 | 3 | 1 | 200 | 246.7 | 9.99 | 0.125 | 2.88 |
| 9 | 4 | 1 | 250 | 325.6 | 14.83 | 0.135 | 2.79 |
| 10 | 5 | 1 | 300 | 404.6 | 20.97 | 0.120 | 2.20 |

A force of 5.42 Newtons was required to collapse the shell to a two-inch (5 centimeter) deflection and the shell immediately recovered its original shape as the test probe was withdrawn.

In all cases, the resilient shells recovered their original shape when the test probe was withdrawn after deforming the shells approximately 4.5 centimeters in Examples 6, and 5 centimeters in Examples 7-10.

EXAMPLES 11-18

Example 1 was repeated except that the ratio of the bicomponent fiber to the PET staple in both the coarse-denier and fine-denier webs were varied and both coarse-denier and fine-denier input webs had a basis weight of 100 g/m². In one set of this series, (Examples 11-14), the face masks or respirators were molded from input webs that had been prebonded at 115° C., and in another set of the series (Examples 15-18), input webs were step prebonded (115°/150° C.) as described in Examples 3-5. In all cases, the molded resilient shaping shells recovered their original shape when the test probe was withdrawn after deforming the shells 5.08 cm.

| EXAMPLE | COARSE-DENIER COMPOSITION* | FINE-DENIER COMPOSITION# | RESISTANCE FORCE (NEWTONS) | DENSITY CENTRAL PORTION (g/cc) | SIDE-TO-CENTRAL DENSITY RATIO | FINISHED BASIS WEIGHT (g/m²) |
|---|---|---|---|---|---|---|
| 11 | 75/25 | 75/25 | 8.32 | 0.104 | 2.87 | 246.7 |
| 12 | 50/50 | 75/25 | 6.54 | 0.134 | 2.68 | 227.0 |
| 13 | 25/75 | 75/25 | 5.64 | 0.108 | 2.40 | 197.2 |
| 14 | 75/25 | 50/50 | 6.09 | 0.118 | 3.29 | 246.7 |
| 15 | 75/25 | 75/25 | 11.51 | 0.122 | 2.57 | 305.9 |
| 16 | 50/50 | 75/25 | 12.72 | 0.108 | 2.80 | 276.3 |
| 17 | 25/75 | 75/25 | 8.92 | 0.099 | 2.86 | 256.6 |

-continued

| EXAMPLE | COARSE-DENIER COMPOSITION* | FINE-DENIER COMPOSITION# | RESISTANCE FORCE (NEWTONS) | DENSITY CENTRAL PORTION (g/cc) | SIDE-TO-CENTRAL DENSITY RATIO | FINISHED BASIS WEIGHT (g/m²) |
|---|---|---|---|---|---|---|
| 18 | 75/25 | 25/75 | 7.62 | 0.095 | 2.89 | 217.1 |

*Ratio indicates the weight-percent 15-denier bicomponent staple fiber to 50-denier crimped 3.8 cm PET staple.
Ratio indicates the weight-percent 4-denier bicomponent staple fiber to 1.75-denier crimped 3.8 cm PET staple.

EXAMPLES 19–21

Example 1 was repeated except that gapping shims of increasing thickness were used between the male and female mold components during the molding operation and the basis weight of the first described web was 150 g/m².

| EXAMPLE | GAPPING SHIM (MILLI-METERS) | RESISTANCE FORCE (NEWTONS) | CENTRAL PORTION (g/cc) | DENSITY SIDE-TO-CENTRAL DENSITY | FINISHED BASIS WEIGHT |
|---|---|---|---|---|---|
| 19 | 0 | 9.98 | 0.124 | 2.87 | 246.7 |
| 20 | 0.635 | 9.68 | 0.095 | 3.75 | 286.2 |
| 21 | 1.27 | 9.54 | 0.094 | 1.67 | 266.4 |

In all cases, the resilient shells recovered their original shape when the test probe was withdrawn after deforming the shells 5 cm.

EXAMPLE 22

A pre-formed cup-shaped filtration layer or body was prepared by first laying a 20-cm-by-20 cm piece of lightweight cover web of polypropylene fibers ("Celestra" web, 0.5 ounce per square yard, available from Crown Zellerbach Corporation) over a 20-cm-by-20 cm piece of electrically charged polypropylene blown microfiber (BMF) web (about 50 g/m² basis weight). The two-layer laminate was folded in half to form an approximate 10-cm-by-20-cm, four-layer laminate structure with the filtration web constituting the inner two layers of the laminate. The assembly was then subjected to a heat-sealing procedure to form a generally sinusoidal wave form bond across approximately the upper one quarter of the assembly (near the fold). The waste material between the bond line and the fold was trimmed and the resultant laminate structure was then opened to form a substantially cup-shaped, pre-formed filtration body having an outer sublayer of the polypropylene cover web and an inner sublayer of the charged web.

A preformed resilient shaping layer or shell was then prepared having as an inner liner a finer-denier shaping layer (approximately 90 g/m² non-woven web prepared on a "Rando Webber" air-laying machine from a mixture of 75 weight-percent 4-denier "Melty Fiber Type 4080" bicomponent staple, 3.8 cm length, and 25 weight-percent 1.75-denier PET staple, 3.8 cm length, which was prebonded at 115° C. for one minute) and as an outer layer, a coarser-denier shaping layer (approximately 180 g/m² non-woven web prepared on a "Rando Webber" air-laying machine from a mixture of 75 weight-percent 15-denier "Melty" fiber Type 4080 bicomponent staple, 3.8 cm length, and 25 weight-percent 50-denier PET staple, 3.8 cm length, which was prebonded at 115° C. for one minute). The shaping layer was prepared by placing an approximate 25 cm by 25 cm piece of the laminate structure in a generally cup-shaped mold with the finer-denier shaping web placed adjacent to the male member of the mold, and molding at approximately 130° C. and approximately 963.2 Newtons pressure for 6–10 seconds.

A resilient filtration face mask of the invention was prepared from the pre-formed filtration layer or body and the resilient shaping layer or shell by placing the filtration "pre-form" over the resilient shaping shell and bonding the two components together by means of a heat-sealed bond running substantially around the perimeter of the mask. A force of 12.1 Newtons was required to collapse the resultant filtration face mask to a 5 cm deflection on the modified King Stiffness Tester described in Example 1, after which the mask immediately recovered its original shape.

The prepared filtration mask was tested according to the test standard for dusts and mists described in 30 Code of Federal Regulations, Section 11.140-5. Penetration of silica dust through the mask body was measured on a breathing machine and determined to be 0.37 milligram with a final exhalation pressure drop of 9.87 millimeters of water, which satisfies the specifications established in the test standard. The density of the resilient shell was 0.15 g/cc.

EXAMPLES 23 AND 24

Filtration face masks of the invention were prepared by laying up in order a finer-denier shaping layer (100 g/m² non-woven web prepared on a "Rando Webber" air-laying machine from a mixture of 75 weight-percent 4-denier "Melty Fiber Type 4080" bicomponent staple, 3.8 cm length, and 25 weight-percent 1.75-denier PET crimped staple, 3.8 cm length, which was prebonded at 115° C. for one minute, cooled to room temperature and then heated to 150° C. for one minute), an electrically charged filtration layer as described in the table below, and a coarser-denier shaping layer (200 g/m² non-woven web prepared on a "Rando Webber" air-laying machine from a mixture of 75 weight-percent 15-denier "Melty Fiber Type 4080" bicomponent staple, 3.8 cm length, and 25 weight-percent 50-denier PET crimped staple, 3.8 cm length, which was prebonded by heating to 115° C. for one minute, cooling to room temperature and then heating to 150° C. for one minute). The resultant assembly was placed in a generally cup-shaped mold, with the finer-denier shaping layer placed adjacent to the male member of the mold, and molded at approximately 130° C. and approximately 963.2 Newtons pressure for 6–10 seconds. The resulting filtration masks were tested for resilience on the modified King Stiffness Tester and averaged a force of 8.96 Newtons to collapse them to a 5 cm deflection, after which they immediately recovered their original shape.

The prepared filtration masks also pass the cited CFR 11.140-5 test standard for dusts and mists.

| EXAMPLE | FILTRATION MEDIA | FILTRATION WEB BASIS WEIGHT |
|---|---|---|
| 23 | Polypropylene BMF | 50 g/m² |
| 24 | Fibrillated-Film Polypropylene Web | 200 g/m² |

EXAMPLES 25 AND 26

Filtration face masks of the invention were prepared according to the procedures described in Examples 23 and 24 except that four layers were assembled in order: a prebonded finer-denier shaping layer (50 g/m²), a prebonded coarser-denier shaping layer (100 g/m²) a filtration layer as described in the table below, and a prebonded coarser-denier shaping layer (100 g/m²). The latter shaping layer formed the outer surface of the face mask. All the shaping layers had compositions as described in Examples 23 and 24.

The prepared filtration masks averaged a force of 15.23 Newtons to collapse them to a 5 cm deflection on the modified King Stiffness Tester, after which they immediately recovered their original shape.

The prepared filtration masks also pass the cited CFR 11.140-5 test standard for dust and mists.

| EXAMPLE | FILTRATION MEDIA | FILTRATION WEB BASIS WEIGHT |
|---|---|---|
| 25 | Polypropylene BMF | 50 g/m² |
| 26 | Fibrillated-Film Polypropylene Web | 200 g/m² |

EXAMPLE 27

A 5.9-ounce-per-square-yard web consisting of a blend of 85 weight-percent 15-denier PET staple fiber and 15 weight-percent of a 3-denier polyester binder fiber and prepared on a "Rando Webber" air-laying machine was assembled between two layers of 30-pound-per-ream web consisting of 60 weight-percent 5.5-denier PET staple fiber and 40 weight-percent of 5-denier undrawn PET binder fiber also prepared on a "Rando Webber" air-laying machine. This assembly was molded in aluminum molds as described in Example 1 at 370° F. for 10 seconds with a zero mold gap. The outer portion of the molded product was then sprayed with a 30 weight-percent solids emulsion in water of acrylic resin. The resultant molded shell was useful as a lofty, resilient, low-pressure-drop molded fibrous shaping layer for a face mask of the invention.

What is claimed is:

1. A resilient cup-shaped filtration face mask adapted to cover the mouth and nose of a wearer of the mask comprising:
   (a) one or more molded fibrous shaping layers that comprise fibers bonded to one another and to other included fibers at intersecting points throughout the layer;
   (b) a fibrous filtration layer disposed on one side of or between said molded fibrous shaping layers, the filtration layer removing a higher percentage of particles from a gaseous stream than the shaping layers remove;
   said molded fibrous shaping layers having a total basis weight of at least about 150 g/m², and at least one said fibrous shaping layer having an average density over the central area of the face mask of no greater than about 0.2 g/cc, such that at bends of the layer during deformation of the face mask the layer elastically deforms and tends to return to its original thickness and shape when the deforming pressure is removed.

2. A face mask of claim 1 in which fibers having an average denier of at least 10 are included in at least one fibrous shaping layer.

3. A face mask of claim 1 or 2 in which the shaping layers have a total basis weight of at least about 200 g/m².

4. A face mask of claim 1 or 2 in which the shaping layers have a total basis weight of at least about 200 g/m², the mask exhibits a resistance to 5-centimeter deformation by a probe pressed against the apex of the mask of at least 5 Newtons, and the mask recovers to its original shape after 5-centimeter deformation.

5. A face mask of claim 1 which includes at least two molded fibrous shaping layers, one of which comprises fibers having an average denier of at least 10 and the other of which comprises fibers having an average denier of less than 10.

6. A face mask of claim 1 in which at least one of the molded fibrous shaping layers includes crimped single-component fibers.

7. A face mask of claim 6 in which the crimped single-component fibers comprise fibers having an average denier of at least 10.

8. A face mask of claim 7 in which the single-component fibers comprise polyethylene terephthalate.

9. A face mask of claim 1 in which the fibrous shaping layers are molded under heat and pressure while assembled in face-to-face contact with the filtration layer, and the shaping and filtration layers are conformed into contact with one another over their full interfaces.

10. A face mask of claim 1 in which at least one shaping layer was heated and conformed into the stated cup shape after it had been first heated to cause bonding between fibers.

11. A face mask of claim 1 in which at least one molded fibrous shaping layer has a patterned variation in thickness such that bands of raised thickness and greater loft are disposed at the center of the mask and alternate with bands of lesser thickness in a generally parallel pattern.

12. A face mask of claim 1 which exhibits a resistance to 5-centimeter deformation by a probe pressed against the apex of the mask of at least about 5 Newtons.

13. A face mask of claim 12 which exhibits recovery to its original shape after 5-centimeter deformation by a probe pressed against the apex of the mask and then released.

14. A face mask of claim 1 which exhibits recovery to its original shape after 5-centimeter deformation by a probe pressed against the apex of the mask and then released.

15. A face mask of claim 1 in which the 10 filtration layer comprises fibers that average less than micrometers in diameter.

16. A face mask of claim 1 in which the filtration layer comprises melt-blown fibers that average less than 10 micrometers in diameter.

17. A resilient filtration face mask comprising:

(a) one or more molded fibrous shaping layers that comprise bicomponent fibers having first and second components extending over the length of the fibers, the first component melting at a temperature lower than the second component and the fibers being bonded to one another and to other included fibers at intersection points throughout the layer by adhesion of the first component to the intersecting fibers; and (b) a fibrous filtration layer disposed on one side of or between said molded fibrous shaping layers, the filtration layer removing a higher percentage of particles from a gaseous stream than the shaping layers remove;

said molded fibrous shaping layers having a total basis weight of at least about 150 g/m$^2$, and at least one said fibrous shaping layer having a density over the central area of the face mask of no greater than about 0.2 g/cc such that at bends of the layer during deformation of the face mask the layer elastically deforms and tends to return to its original thickness and shape when the deforming pressure is removed.

18. A face mask of claim 17 in which bicomponent fibers having an average denier of at least 10 are included in at least one fibrous shaping layer.

19. A face mask of claim 17 which includes at least two molded fibrous shaping layers, one of which comprises bicomponent fibers having an average denier of at least 10 and the other of which comprises only fibers having an average denier of less than 10.

20. A face mask of claim 17, 18 or 19 in which at least one of the molded fibrous shaping layers includes crimped single-component fibers.

21. A face mask of claim 17, 18 or 19 in which at least one of the molded fibrous shaping layers includes crimped single-component fibers that have an average denier of at least 10.

22. A face mask of claim 17, 18 or 19 in which bicomponent fibers comprise at least about 75 weight-percent of at least one of the molded fibrous shaping layers.

23. A face mask of claim 17, 18 or 19 in which bicomponent fibers comprise at least about 75 weight-percent of at least one of the molded fibrous shaping layers, and the layer further includes crimped single-component fiber.

24. A face mask of claim 17, 18 or 19 in which bicomponent fibers comprise at least about 75 weight-percent of at least one of the molded fibrous shaping layers, and the layer further includes single-component fiber having an average denier of at least 10.

25. A face mask of claim 17, 18 or 19 in which the shaping layers have a total basis weight of at least about 250 g/m$^2$.

26. A face mask of claim 17, 18 or 19 in which the shaping layers have a total basis weight of at least about 250 g/m$^2$, and bicomponent fibers comprise at least about 75 weight-percent of at least one shaping layer.

27. A face mask of claim 17, 18 or 19 in which the shaping layers have a total basis weight of at least about 250 g/m$^2$, bicomponent fibers comprise at least about 75 weight-percent of at least one shaping layer, and that shaping layer includes crimped single-component fiber having an average denier of at least 10.

28. A face mask of claim 17, 18 or 19 in which the shaping layers have a total basis weight of at least about 250 g/m$^2$, bicomponent fibers comprise at least about 75 weight-percent of at least one shaping layer, the mask exhibits a resistance to 5-centimeter deformation by a probe pressed against the apex of the mask of at least 5 Newtons, and the mask recovers to its original shape after 5-centimeter deformation.

29. A face mask of claim 17 in which at least one of the molded fibrous shaping layers includes single-component fibers that comprise polyethylene terephthalate.

30. A face mask of claim 17, 18, 19 or 29 in which the first and second components of the bicomponent fibers comprise polyester.

31. A face mask of claim 17, 18, 19 or 29 in which the second component of the bicomponent fiber comprises polyethylene terephthalate.

32. A face mask of claim 17, 18, 19 or 29 in which the first component of the bicomponent fiber comprises a copolymer of ethylene terephthalate and ethylene isophthalate.

33. A face mask of claim 17 in which the fibrous shaping layers are molded under heat and pressure while assembled in face-to-face contact with the filtration layer, and the shaping and filtration layers are conformed into contact with one another over their full interfaces.

34. A face mask of claim 17 in which at least one shaping layer was heated and conformed into the stated cup shape after it had been first heated to cause bonding between fibers.

35. A face mask of claim 17 in which at least one molded fibrous shaping layer has a patterned variation in thickness such that bands of raised thickness and greater loft are disposed at the center of the mask and alternate with bands of lesser thickness in a generally parallel pattern.

36. A face mask of claim 17 which exhibits a resistance to 5-centimeter deformation by a probe pressed against the apex of the mask and then released of at least 5 Newtons.

37. A face mask of claim 36 which exhibits recovery of its original shape after 5-centimeter deformation by a probe pressed against the apex of the mask and then released.

38. A face mask of claim 17 which exhibits recovery to its original shape after 5-centimeter deformation by a probe pressed against the apex of the mask and then released.

39. A face mask of claim 17 in which the filtration layer comprises fibers that average less than 10 micrometers in diameter.

40. A face mask of claim 17 in which the filtration layer comprises melt-blown fibers that average less than 10 micrometers in diameter.

41. A cup-shaped filtration face mask comprising:
(a) one or more molded fibrous shaping layers at one of which comprises bicomponent fibers that average 10 denier or larger in diameter and that have first and second components extending over the length of the fibers, the first component melting at a temperature lower than the second component and the fibers being bonded to one another and to other included fibers at intersection points throughout the layers by adhesion of the first component to the intersecting fibers; and
(b) a fibrous filtration layer disposed on one side of or between said mole fibrous shaping layers, the filtration layer removing a higher percentage of particles from a gaseous stream than the shaping layers remove; said molded fibrous shaping layers having a total basis weight of at least about 150 g/m$^2$ but causing less than half the pressure drop in a gaseous stream flowing through the face mask; and at least one fibrous shaping layer having an average density over the central area of the mask of no greater than about 0.2 g/cc such that at bends of the layer during deformation of the face mask the layer elastically deforms and tends to return to its original thickness and shape when the deforming pressure is removed; and the face mask exhibiting a resistance to 5-centimeter deformation of at least 5 Newtons when a probe is pressed against the apex of the mask and recovery to its original shaped after such 5-centimeter deformation.

42. A face mask of claim 41 which includes a fibrous inner layer that includes only fibers having an average denier of less than 10.

43. A face mask of claim 41 in which at least one molded fibrous shaping layer comprises crimped fibers of at least 10 denier.

44. A face mask of claim 41 in which at least one shaping layer was heated and conformed into the cup shape after it had first been heated to cause bonding between fibers.

45. A face mask of claim 41 in which the fibrous shaping layers are molded under heat and pressure while assembled in face-to-face contact with the filtration layer, and the shaping and filtration layers are conformed into contact with one another over their full interfaces.

46. A face mask of claim 41 in which the molded fibrous shaping layers have a patterned variation in thickness such that bands of raised thickness and greater loft extend across the width at at least the height of the cup shape and alternate with bands of lesser thickness in a generally parallel pattern.

47. A face mask of claim 41 in which the filtration layer comprises fibers less than 10 micrometers in average diameter.

48. A face mask of claim 41 in which the filtration layer comprises melt-blown fibers that average less than 10 micrometers in diameter.

49. A cup-shaped filtration face mask comprising:
(a) one or more molded fibrous shaping layers at least one of which comprises at least about 75 weight-percent bicomponent fibers that average 10 denier or larger in diameter and that have first and second components extending over the length of the fibers, the first component melting at a temperature lower than the second component and the fibers being bonded to one another and to other included fibers at intersection points throughout the layers by adhesion of the first component to the intersecting fibers; and (b) a fibrous filtration layer disposed on one side of or between said molded fibrous shaping layers, the filtration layer removing a higher percentage of particles from a gaseous stream than the shaping layers remove; said molded fibrous shaping layers having a total basis weight of at least about 250 g/m² but causing less than half the pressure drop in a gaseous stream flowing through the face mask; and at least one fibrous shaping layer having an average density over the central area of the mask of no greater than about 0.2 g/cc such that at bends of the layer during deformation of the face mask the layer elastically deforms and tends to return to its original thickness and shape when the deforming pressure is removed; and the face mask exhibiting a resistance to 5-centimeter deformation of at least 5 newtons when a probe is pressed against the apex of a mask and recovery to its original shape after such 5-centimeter deformation.

50. A face mask of claim 49 in which at least one molded fibrous shaping layer comprises crimped fibers of at least about 50 denier.

51. A face mask of claim 50 in which the bicomponent fibers comprise polyester components and the crimped fibers comprise polyethylene terephthalate.

52. A face mask of claim 49 including a first outer molded fibrous shaping layer, a filtration layer, a second molded fibrous shaping layer, and a third inner molded fibrous shaping layer, the latter only including fibers of less than 10 denier.

53. A face mask of claim 49 in which the fibrous shaping layers are molded under heat and pressure while assembled in face-to-face contact with the filtration layer, and the shaping and filtration layers are conformed into contact with one another over their full interfaces.

54. A face mask of claim 49 in which at least one molded fibrous shaping layer has a patterned variation in thickness such that bands of raised thickness and greater loft are disposed at the center of the mask and alternate with bands of lesser thickness in a generally parallel pattern.

55. A face mask of claim 49 in which the bicomponent fibers comprise polyester components.

56. A face mask of claim 1, 17, 41, or 49 in which the filtration layer is preformed, and assembled over and bonded to said molded fibrous shaping layer.

57. A face mask of claim 1, 17, 41 or 49 in which the filtration layer and an outer cover web are preformed and assembled and bonded to said molded fibrous shaping layer.

* * * * *

UNITED STATES PATENT AND TRADEMARK OFFICE
CERTIFICATE OF CORRECTION

PATENT NO. : 4,807,619

DATED : February 28, 1989

INVENTOR(S) : James F. Dyrud; Harvey J. Berg; & Alice C. Murray

It is certified that error appears in the above-identified patent and that said Letters Patent is hereby corrected as shown below:

Claim 15, Col. 14, line 62, after "the" delete "10"; and
line 63, after "than" insert -- 10 --.

Claim 41, Col. 16, line 63, "mole" should be -- molded --; and
Col. 17, line 11, "shaped" should be -- shape --.

Signed and Sealed this

Fifth Day of December, 1989

*Attest:*

JEFFREY M. SAMUELS

*Attesting Officer*     *Acting Commissioner of Patents and Trademarks*